(12) United States Patent
Zhou

(10) Patent No.: US 12,514,692 B2
(45) Date of Patent: Jan. 6, 2026

(54) STRUCTURE FOR COUPLING TOOTHBRUSH HEAD TO ELECTRIC TOOTHBRUSH HANDLE

(71) Applicant: JS Holding Inc., Dover, DE (US)

(72) Inventor: Xin Zhou, Irvine, CA (US)

(73) Assignee: Oralic Supplies, Inc., Encino, CA (US)

( * ) Notice: Subject to any disclaimer, the term of this patent is extended or adjusted under 35 U.S.C. 154(b) by 337 days.

(21) Appl. No.: 18/303,371

(22) Filed: Apr. 19, 2023

(65) Prior Publication Data

US 2023/0338126 A1 Oct. 26, 2023

Related U.S. Application Data

(60) Provisional application No. 63/365,162, filed on May 23, 2022, provisional application No. 63/363,285, filed on Apr. 20, 2022.

(51) Int. Cl.
*A61C 17/22* (2006.01)
*A46B 5/00* (2006.01)

(52) U.S. Cl.
CPC .......... *A61C 17/222* (2013.01); *A46B 5/0095* (2013.01)

(58) Field of Classification Search
CPC ............................ A61C 17/222; A46B 5/0095
See application file for complete search history.

(56) References Cited

U.S. PATENT DOCUMENTS

| | | | | |
|---|---|---|---|---|
| 3,369,265 A | * | 2/1968 | Halberstadt | A61C 17/32 16/427 |
| 7,386,906 B2 | * | 6/2008 | Roth | A46B 13/06 15/97.1 |
| 8,782,841 B2 | * | 7/2014 | Sale | A61C 17/222 15/22.1 |
| 9,107,486 B2 | * | 8/2015 | Brewer | A45D 34/042 |
| 9,439,741 B2 | * | 9/2016 | Dishon | A46B 9/04 |
| 9,439,742 B2 | * | 9/2016 | Shimoyama | A61C 17/3481 |
| 9,724,180 B1 | * | 8/2017 | Liu | A61C 17/222 |
| 9,827,079 B1 | * | 11/2017 | Liu | A46B 5/0095 |
| D830,699 S | | 10/2018 | Liu | |
| D838,990 S | | 1/2019 | Liu | |
| 10,470,858 B2 | * | 11/2019 | Liu | A46B 15/0071 |

(Continued)

FOREIGN PATENT DOCUMENTS

| | | | | |
|---|---|---|---|---|
| DE | 202021103701 U1 | * | 8/2021 | |
| WO | WO-2009077922 A1 | * | 6/2009 | A61C 17/222 |
| WO | 2022028613 A1 | | 2/2022 | |

OTHER PUBLICATIONS

U.S. Appl. No. 18/192,334, filed Mar. 29, 2023.
U.S. Appl. No. 29/866,819, filed Sep. 28, 2022.

*Primary Examiner* — Marc Carlson
(74) *Attorney, Agent, or Firm* — Fox Rothschild LLP

(57) ABSTRACT

This document discloses a toothbrush head for an electric toothbrush. The toothbrush head includes a brush section having a plurality of bristles attached thereon, a base having an opening for receiving a drive shaft of an electric toothbrush, and a coupling member. The coupling member has a sidewall that surrounds a cavity for receiving the driveshaft. The sidewall has at least two apertures therethrough and a resilient wall between the apertures. The resilient wall forms a protrusion extending away from the cavity and is configured to engage with the driveshaft when the driveshaft is inserted into the coupling section.

20 Claims, 10 Drawing Sheets

(56) References Cited

U.S. PATENT DOCUMENTS

| | | | |
|---|---|---|---|
| D868,811 S | 12/2019 | Jeon et al. | |
| 10,531,729 B1* | 1/2020 | Liu | A46B 7/042 |
| 10,912,377 B1* | 2/2021 | Kuang | A61C 17/3481 |
| 11,071,612 B1 | 7/2021 | Zhou | |
| 11,071,613 B1* | 7/2021 | Zhou | A61C 17/222 |
| 11,229,507 B1 | 1/2022 | Zhou | |
| 11,253,052 B2* | 2/2022 | Huang | A61C 17/222 |
| D954,441 S | 6/2022 | Zhou | |
| D958,542 S | 7/2022 | Zhou | |
| 11,413,126 B2 | 8/2022 | Kuang | |
| 11,439,488 B2* | 9/2022 | Kuang | A61C 17/3481 |
| D968,097 S * | 11/2022 | Zhou | D4/101 |
| 11,638,635 B2* | 5/2023 | Zhou | A46B 9/04 |
| | | | 15/22.1 |
| 11,890,153 B2* | 2/2024 | Zhou | A46B 5/0095 |
| 12,201,493 B2* | 1/2025 | Zhou | A46B 9/04 |
| 2005/0108838 A1* | 5/2005 | Schaefer | A61C 17/22 |
| | | | 15/22.1 |
| 2011/0107536 A1* | 5/2011 | Dabrowski | A61C 17/222 |
| | | | 15/167.1 |
| 2013/0255014 A1* | 10/2013 | Kloster | A61C 17/222 |
| | | | 15/22.1 |
| 2015/0082560 A1* | 3/2015 | Graeve | A61C 17/222 |
| | | | 15/22.1 |
| 2015/0245895 A1* | 9/2015 | Kressner | A61C 17/225 |
| | | | 15/22.1 |
| 2018/0228584 A1* | 8/2018 | Sokol | A61C 17/227 |
| 2022/0039545 A1* | 2/2022 | Kuang | A46B 5/0095 |
| 2022/0039929 A1* | 2/2022 | Kuang | A61C 17/222 |
| 2022/0039932 A1* | 2/2022 | Kuang | A61C 17/3418 |
| 2022/0133457 A1 | 5/2022 | Zhou | |
| 2022/0273407 A1* | 9/2022 | Zhou | A46B 9/04 |

* cited by examiner

STRUCTURE FOR COUPLING TOOTHBRUSH HEAD TO ELECTRIC TOOTHBRUSH HANDLE

RELATED APPLICATIONS AND CLAIM OF PRIORITY

This patent document claims priority to U.S. Provisional Patent Application No. 63/363,285, filed Apr. 20, 2022, and U.S. Provisional Patent Application No. 63/365,162, filed May 23, 2022. The disclosures of each priority application are fully incorporated into this document by reference.

BACKGROUND

This disclosure relates to the field of electric toothbrushes, and particularly brush heads that are configured to couple to an electric toothbrush handle.

Many types of electric toothbrushes use high speed vibrations of the motor inside the toothbrush handle to drive the brush head. In order to operate the electric toothbrush, the construction of the brush head requires that it be tightly coupled to the drive shaft of the toothbrush handle so it can withstand the high speed vibrations from operating the toothbrush. Many existing products, therefore, use metal or springs inside the brush head to facilitate a tight coupling to the drive shaft of the toothbrush handle. This can increase the cost of making the brush head.

In addition, while some brush heads avoid the use of metal springs, those brush heads can sometimes have difficulty staying connected to the handle, and/or may not offer as much vibratory effect due to a loose fit.

This patent document describes an apparatus that addresses at least some of the issues described above and/or other issues.

SUMMARY

In a first aspect, this document discloses a toothbrush head for an electric toothbrush, the toothbrush head including a brush section having a plurality of bristles attached thereon, a base having an opening for receiving a drive shaft of an electric toothbrush, and a coupling member. The coupling member includes a sidewall that surrounds a cavity for receiving the driveshaft, and the sidewall has at least two apertures therethrough and a resilient wall between the apertures. The resilient wall is configured to engage with the driveshaft when the driveshaft is inserted into the coupling section. Further, the resilient wall forms a protrusion extending away from the cavity. The protrusion can be configured to engage an inner wall of the base.

In some embodiments, a width of the coupling member at the protrusion is greater than a width of a corresponding portion of the base where the protrusion engages the inner wall. The resilient wall can be configured to deform when inserted into the base. The deformation can cause inward movement of a portion of the resilient wall that is configured to engage the driveshaft. Optionally, the protrusion is formed by an outwardly curved portion of the resilient wall.

In some embodiments, the resilient wall further comprises a driveshaft contact extending into the cavity. The coupling member can further include a mounting portion and the mounting portion is engaged with the base. The mounting portion of the coupling member can include a circumferential ridge. The base can further include a circumferential groove and the circumferential ridge can be engaged with the circumferential groove. In other embodiments, the mounting portion of the coupling member can include a circumferential groove, the base can include a circumferential ridge; and the circumferential ridge of the base is engaged with the circumferential groove of the coupling member.

In another aspect, this document discloses a toothbrush head for an electric toothbrush having a brush section having a plurality of bristles attached thereon, a base having an opening for receiving a drive shaft of an electric toothbrush, and a stem section connecting the base and brush section. The stem section has a cylindrical sidewall that surrounds a cavity for receiving the driveshaft. The cavity is in communication with the opening. Additionally, the cylindrical sidewall can include a ridge extending into the cavity configured to engage with the driveshaft when the driveshaft is inserted into the cavity. The brush section, base, and stem section are formed as a single piece.

In some embodiments, the stem section further includes a second cavity, the second cavity being disposed between the cavity for receiving the driveshaft and the brush section. In some embodiments, the second cavity extends along at least 50 percent of the stem section. The toothbrush head can further include a ledge disposed between the stem section and the base. A thickness of the stem sidewall can be greater at a portion closer to the base than a thickness of the stem sidewall at a portion closer to the brush section.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the term "connected", when referring to two physical structures, means that the two physical structures touch each other. Devices that are connected may be secured to each other, or they may simply touch each other and not be secured.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

This disclosure is not limited to the particular systems, methodologies or protocols described, as these may vary. The terminology used in this description is for the purpose of describing the particular versions or embodiments only, and is not intended to limit the scope.

Figure 8:
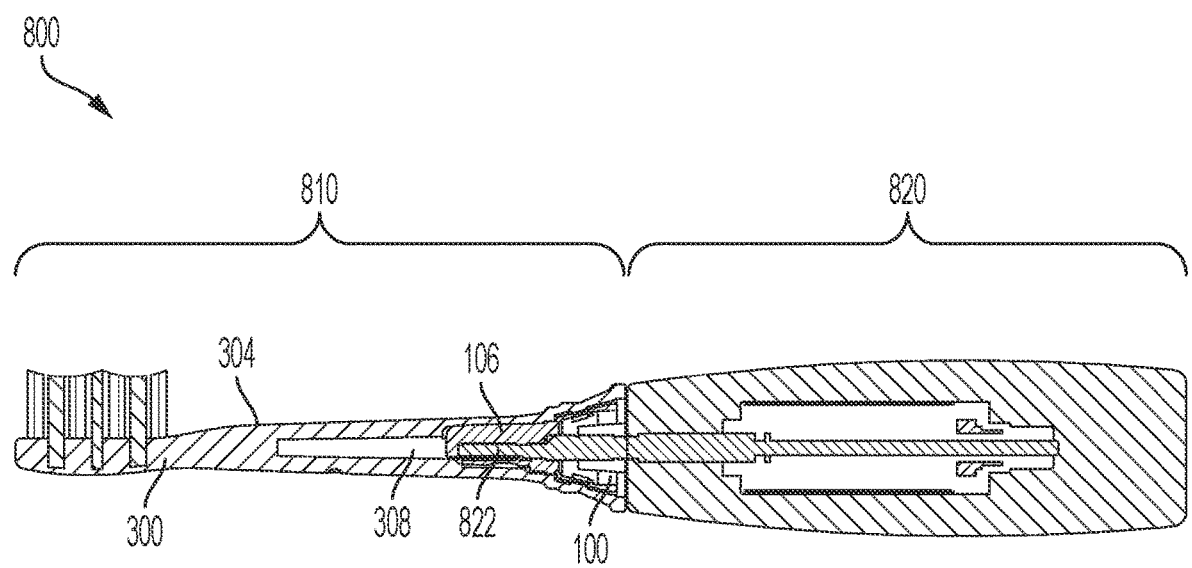
FIG. 8 is a cross-sectional view illustrating how a brush head and a coupling member may attach to a toothbrush handle.

In various embodiments, a brush head is couplable to a drive shaft of an electric toothbrush handle, as shown in FIG. 8. The brush head can be couplable to the drive shaft optionally using a coupling member that is received within the brush head. The coupling member is the structure that will receive and attach to the drive shaft of the electric toothbrush handle.

FIGS. 1A, 1B, 1C, 1D, 2A, and 2B illustrate various views of an exemple coupling member 100. The coupling member 100 can have a receiving section 102 and a base 104. The base 104 has an opening 122 for receiving the drive shaft of an electric toothbrush handle. The opening 122 is at one end (which may be referred to as a bottom end) of the base 104. The opposite end (which may be referred to as a top) of the base 104 is the end from which the receiving section 102 extends. The top end of the base 104 has a diameter that is narrower than the diameter of the opening 122 so that the body flares outward as the distance from the receiving section 102 increases.

Figure 1C:
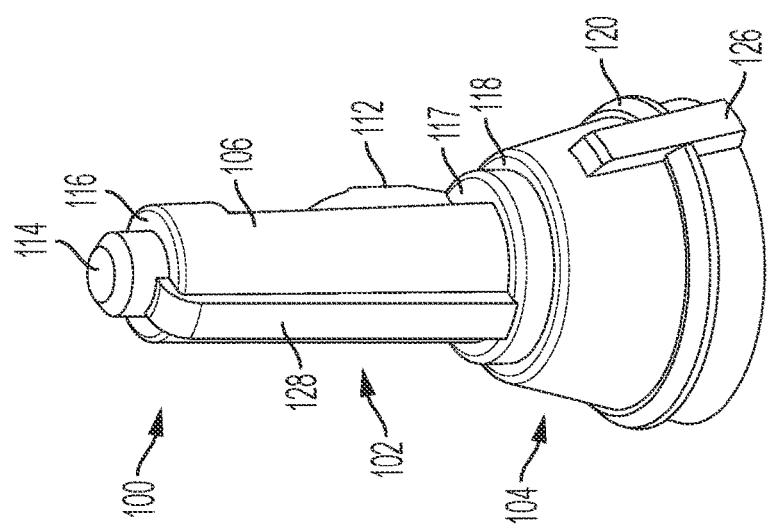
FIGS. 1A, 1B, and 1C are a perspective views of an example toothbrush head coupling member.
Figure 1B:
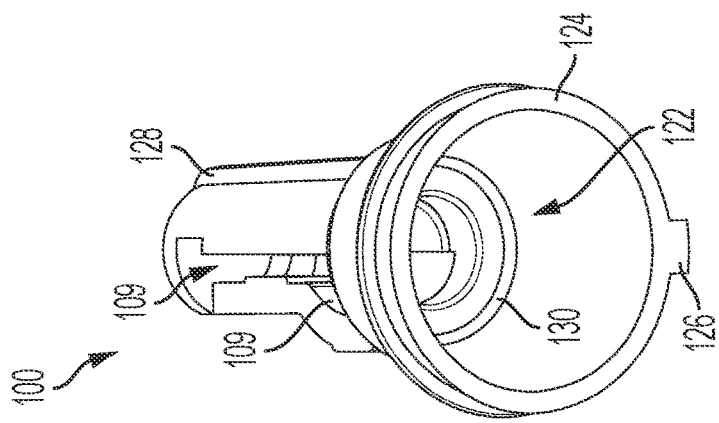
Figure 1A:
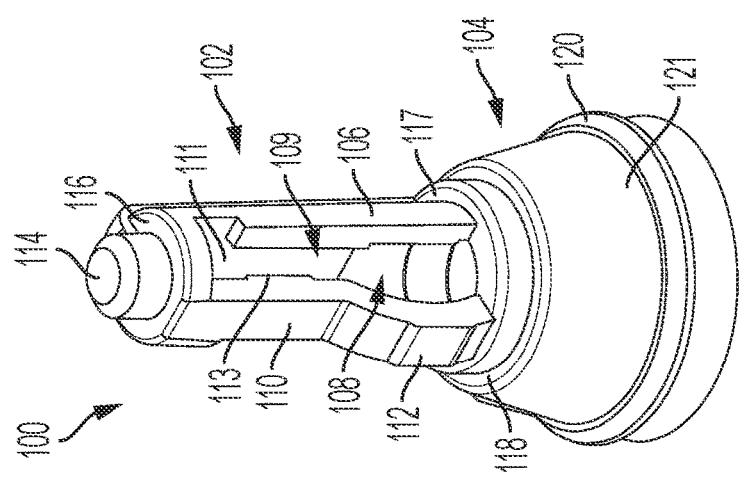
Figure 1D:
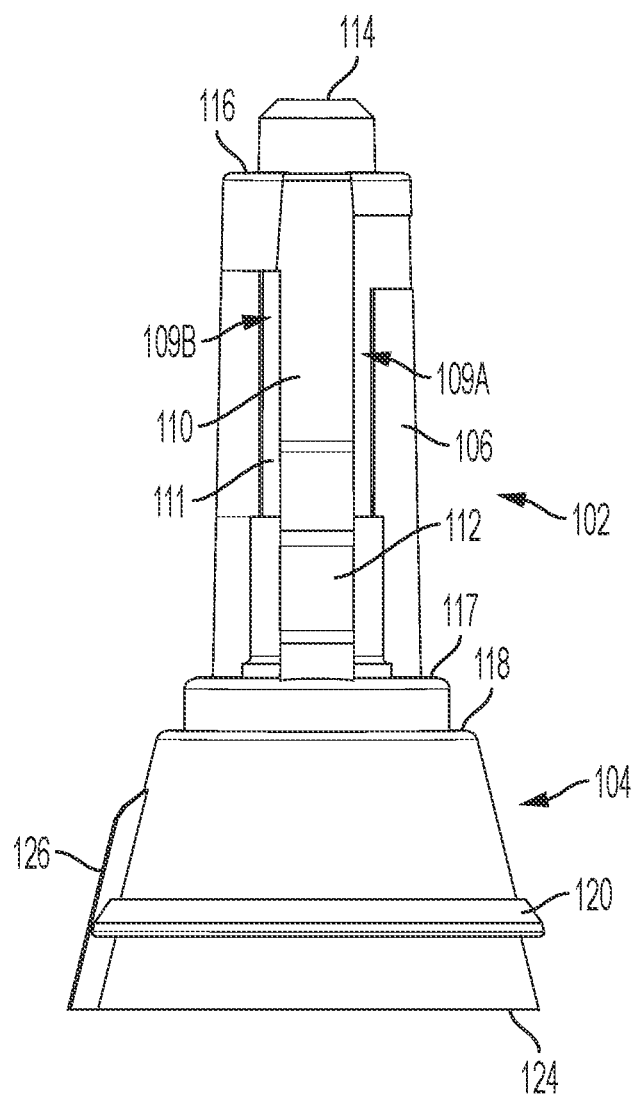
FIG. 1D is a front view of an example toothbrush head coupling member.
Figure 2B:
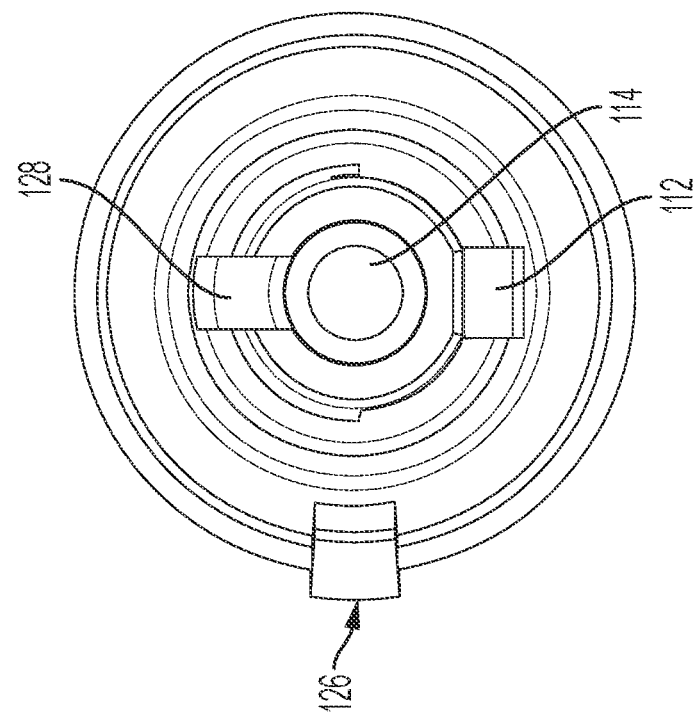
FIG. 2B is a top view of the coupling member of FIG. 1.
Figure 2A:
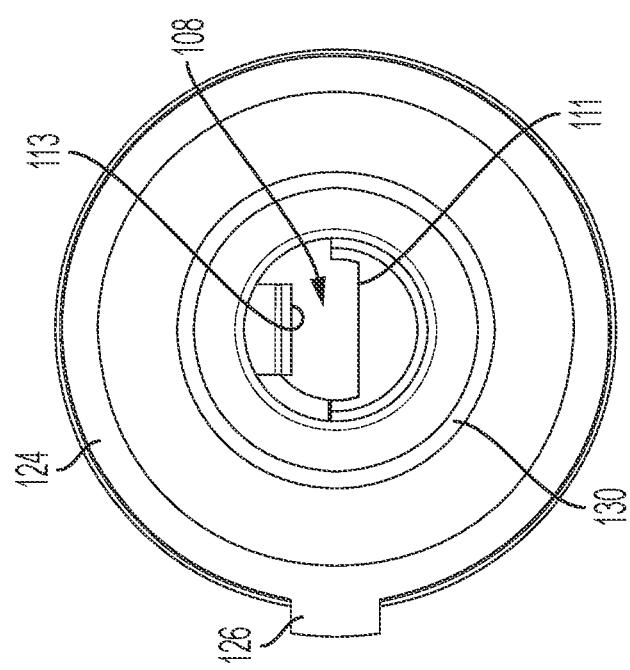
FIG. 2A is a bottom view of the exemple coupling member of FIG. 1.

The base 104 has one or more mounting portions 120 that are positioned to engage with a corresponding portion of a brush head so that the coupling member 100 can be mounted to the brush head. For example, as depicted in FIG. 1A, mounting portion 120 can be a circumferential ridge disposed on the outer surface of base 104. Base 104 can also include a indexing ridge 126 extending longitudinally from the bottom face 124 of base 104 towards ledge 118. Indexing ridge 126 can extend partially along base 104 (e.g., as shown in FIG. 1C), or in other embodiments, can extend up to ridge 118.

Figure 9:
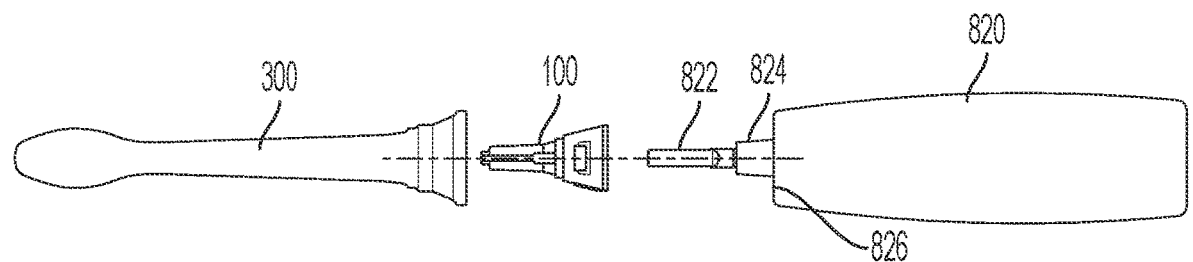
FIG. 9 is an exploded view illustrating how a brush head and a coupling member may attach to a toothbrush handle.

Base 104 can transition into receiving section 102 at ledge 118. In some embodiments, ledge 118 may serve as a stop to ensure proper placement of the coupling member 100 within a brush head. A second ledge 117 may have a smaller diameter than ledge 118 and may similarly serve as a stop, in some embodiments. Receiving section 102 may extend from ledge 117. Similarly, the interior of coupling member 100 can include a ledge 130 that may serve as a stop for the toothbrush handle when the coupling member is placed over the driveshaft of the toothbrush handle. For example, as shown in FIGS. 9 and 10, boss 824 of the toothbrush handle 820 can contact ledge 130. Similarly, bottom face 124 can contact base 826 of the toothbrush handle, thereby limiting the insertion of the driveshaft into coupling member 100.

The receiving section 102 has a generally cylindrical sidewall 106 that surrounds a cavity 108 that will receive the drive shaft of the electric toothbrush. The sidewall 106 can include an opening or aperture 109 into the cavity. The opening 109 can extend completely through receiving section 102 (i.e., forming two apertures 109A and 109B, one on each side of resilient member 110 such that the resilient member 110 is between them). Such extension of opening 109 can separate sidewall 106 from both sides of resilient member 110 (see, e.g., FIGS. 1B and 4A). Resilient member 110 can include an interior driveshaft contact 113, which is a structure that extends inward from the resilient member 110 toward the cavity. The driveshaft can be disposed between driveshaft contact 113 and wall 111, contacting both when inserted into cavity 108.

Resilient member 110 can include protrusion 112. Protrusion 112 can extend outward (away from cavity 108) as resilient member extends downward from about where driveshaft contact 113 is located towards base 104. Protrusion 112 can take a variety of suitable forms, for example, a curved portion having a flat outer surface (as depicted in the figures). Other forms may include a plateau with sides that extend from the plateau toward the resilient member at an angle of 90 degrees or more, or a peak with sides that extend from the plateau toward the resilient member at an angle of 90 degrees or more. The outside surface of protrusion 112 can contact the inner wall of the brush head stem, which can bias the resilient member inward towards wall 111, thereby applying increased pressure to the driveshaft in cavity 108 when the brush head and coupling member 100 are installed on a toothbrush handle. Protrusion 112 can be located on the lower portion of resilient member 110, below driveshaft contact 113. The outside of resilient member 110 can include a flat portion about protrusion 112 (on the outside of driveshaft contact 113. The location of protrusion 112 (i.e., spaced apart from driveshaft contact 113), can provide leverage for increased displacement of driveshaft contact 113 and further increases in the force applied to the driveshaft by resilient member 110. This bias and the advantages of the protrusion 112 are described in greater detail below with respect to FIGS. 4A, 4B, and 5.

In the figures, driveshaft contact 113 is depicted as a substantially planar flat portion slightly raised from the interior surface of resilient wall 110. However, driveshaft contact 113 could take a variety of different forms such as one or more larger protrusions (e.g., ridges, teeth, or other raised areas). The large protrusions could contact the driveshaft when it is inserted into cavity 108 (through cavity 122) of coupling member 100. Such protrusions can help increase engagement between the resilient wall and the driveshaft. The protrusions may be soft and/or resilient, providing a springing action that facilitates vibration of the driveshaft while it contacts the protrusions. For example, the teeth may be formed of a soft plastic such as a low density polyethylene (LDPE), rubber, or other suitable material. The entire coupling member 100 may be made of such material, or the teeth and other components of the coupling member 100 may be made of different materials.

Receiving section 102 may include a longitudinal ridge 128 on an outside surface of the sidewall 106. The longitudinal ridge 128 is positioned and sized to engage with a longitudinal channel inside the stem (shown as 322 in FIG. 3B). This engagement between the longitudinal ridge 128 and the longitudinal channel 322 inside the stem prevents the coupling member 100 from rotating about the longitudinal axis of the stem. It further provides a guide to facilitate the insertion of the coupling member 100 into the stem. Protrusion 112 of resilient member 110 may also engage with a second longitudinal channel inside the stem (shown as 324 in FIG. 3B) and may similarly limit rotation of the coupling member 100 inside the stem.

Figure 4A:
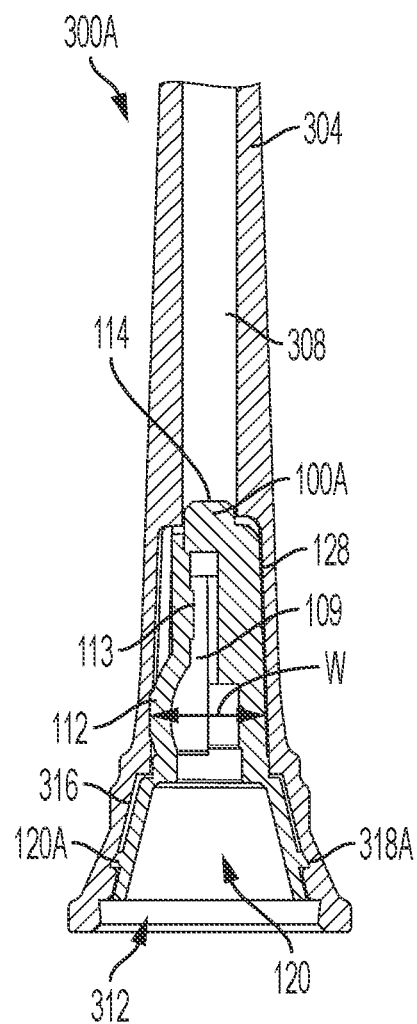
FIG. 4A is a cross-sectional view of a brush head with an installed coupling member.
Figure 4B:
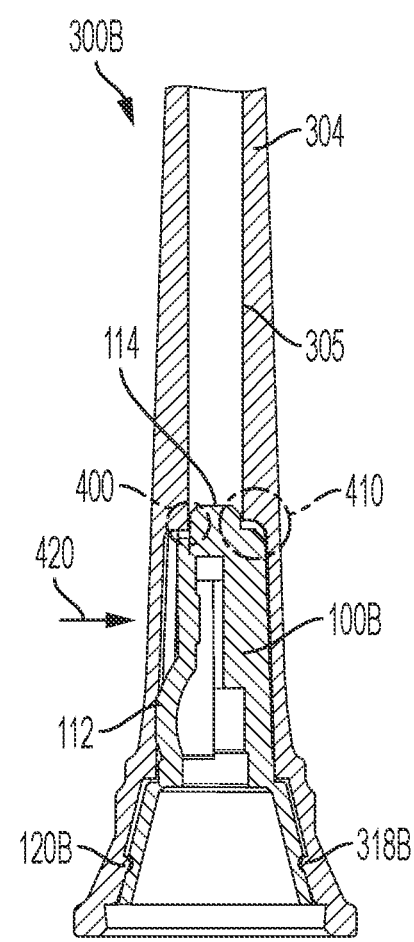
FIG. 4B is cross-sectional view of another embodiment of a brush head with an installed coupling member.

Alternatively, and/or additionally, as shown in FIGS. 1-2, the coupling section 102 may end with a tip 114 that has a diameter that is smaller than that of the sidewall 106. The tip 114 meets the sidewall 106 at a ledge 116. The tip 114 and ledge 116 further facilitate the coupling of the coupling section 102 and the brush head stem, and the ledge 116 serves as a stop to limit the distance of travel of the coupling member 100 into the brush head stem. As shown in FIGS. 4A and 4B, the tip 114 can extend into stem cavity 307, stopping at ledge 116.

Figure 3C:
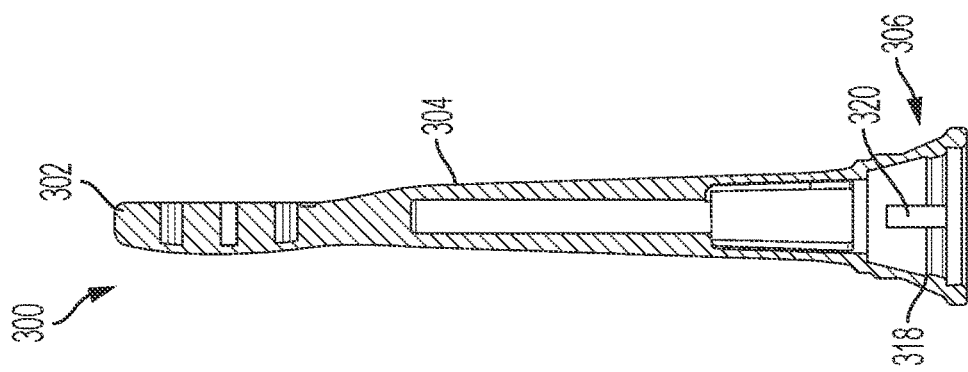
FIG. 3C is another cross-sectional view of a brush head without an installed coupling member.
Figure 3B:
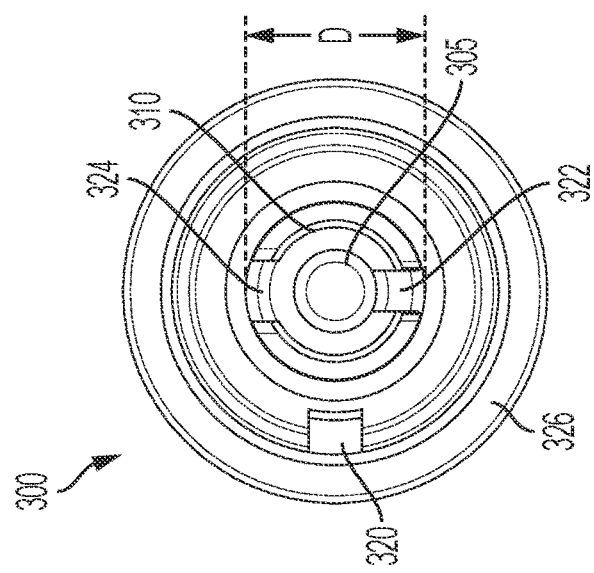
FIG. 3B is a bottom view of a brush head without an installed coupling member.
Figure 3A:
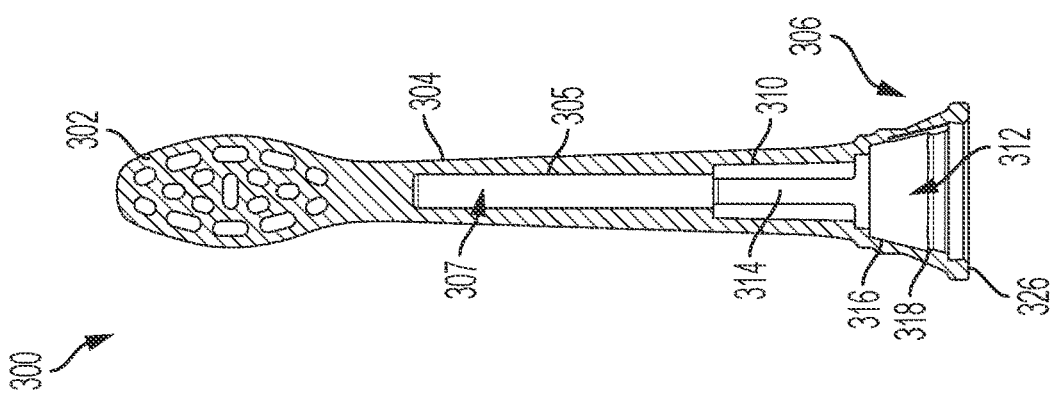
FIG. 3A is a cross-sectional view of a brush head without an installed coupling member.

FIGS. 3A-3C illustrate an example brush head. As shown in FIG. 1, the brush head 300 can include a bristle tray 302 that is a portion of the brush head from which multiple attached bristles can extend. The brush head 300 also has a stem 304, which extends from the bristle tray 302, leading to a base 307 that flares outward from the stem. In use, the base will be placed over the drive shaft of an electric toothbrush handle. The stem 304 and base 307 each have an opening that leads to a channel 314 for receiving and mounting a coupling member 100, which may be in the form of coupling member 100 of FIGS. 1A-2B, or another structure.

The interior of stem 304 can include a cavity 307 formed by a sidewall 305. The cavity can be generally cylindrical and extend within a majority of the stem 304. Stem cavity 307 can transition into a receiving cavity 314, as the stem 304 approaches base 306. Receiving cavity 314 can receive coupling member 100 for attaching to an electric toothbrush handle driveshaft. For example, receiving section 102 of coupling member 100 may be disposed within receiving cavity 314. As shown in FIG. 3B, the sidewall of the receiving cavity 314 portion of brush head 300 can include two additional cavities 322, 324. These cavities 322, 324 can allow the brush head 300 to engage with other portions of coupling member 100. For example, cavity 322 can engage with longitudinal ridge 128 of coupling member 100. Similarly, cavity 324 can engage with protrusion 112 of resilient member 110 of coupling member 100. As shown, cavities 322, 324 can be depressions in the sidewall that forms receiving cavity 314. Engagement of either the longitudinal ridge 128 or protrusion 112 of coupling member 100 with the respective cavity 322, 324, can prevent rotation of brush head 300 relative to coupling member 100.

Base 306 can also include a similar feature limiting relative rotation of coupling member 100 and brush head 300. For example, base may include indexing recess 320, which may can engage with indexing ridge 126 of coupling member 100. While the figures depict an indexing ridge 126, coupling member 100 could include an indexing recess or slot that can engage with a corresponding ridge on the interior rush head 300 (i.e., indexing ridge 126 and indexing recess 320 could be interchanged). Further, base 306 can include securing portion 318 that engages with mounting portion 120 of coupling member 100. Securing portion 318 can be a circumferential groove or ridge that corresponds with mounting portion 120 of coupling member 100. For example, if mounting portion 120 is a ridge, securing portion 318 could be a groove. If mounting portion 120 is a groove, securing portion 318 could be a ridge.

Figure 5:
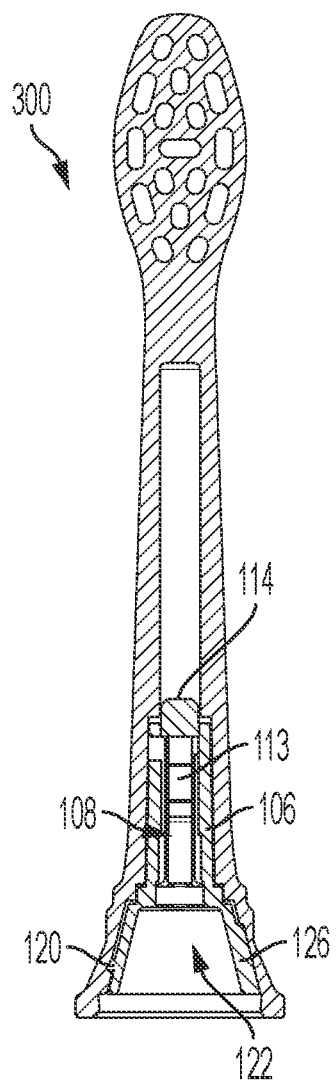
FIG. 5 is a cross-sectional view of a brush head with an installed coupling member.

FIGS. 4A and 4B are cross-sectional views showing coupling member 100 installed in a brush head 300. FIGS. 4A and 4B, respectively, each represent a different variation of couplings between a coupling member and a brush head, specifically in the base of each component. FIG. 5 is alternate cross-sectional view of the embodiment of FIG. 4A. For example, FIG. 4A illustrates a variation of coupling member 100A having a mounting portion 120A that is a circumferential ridge. The circumferential ridge of mounting portion 120A engages with circumferential groove 318A of brush head 300A. Conversely, FIG. 4B illustrates a variation of coupling member 100B having a mounting portion 120B that is a circumferential groove. As shown in FIG. 4B, the circumferential groove of mounting portion 120B engages with circumferential ridge 318B of brush head 300B.

As illustrated in the figures, the size and shape of the cross-section of the coupling section 102 of coupling member 100 may correspond to the size and shape of the stem 304 and stem cavity 307 of the brush head 300. For example, the width W (shown in FIG. 4A) of the coupling section 102 from the outer flat surface of protrusion 112 to longitudinal ridge 128 can be about 0.28 inches (slightly larger than about ¼ inch), while the length (from tip 114 to ledge 118) can be about 0.68 inches (slightly larger than ½ inch). The base 306 may extend from the coupling section and flare outward to the opening 312 to form a semi-conical shape. The opening 312 may be of various sizes, for example, opening 312 may have an inside diameter of about 0.41 inches (slightly less than about ½ inch).

The static width W of coupling section 102 might also be larger than the distance D of the inside of cavity 314 of brush head 300. Distance D (as shown in FIG. 3B) can be measured from the outer wall of cavity 322 to the outer wall of cavity 324. This difference in the width W of coupling section 102 and measurement D of the inside of cavity 314 can cause protrusion 112 of resilient member 110 to be biased inward towards inner wall 111 of coupling member 100 when the coupling member is inserted into brush head 300. This biasing driveshaft contact 113 to move further into cavity 108, thereby increasing the force applied to the driveshaft when the coupling member and brush head 300 are installed on a toothbrush handle. This deformation causing inward movement of the driveshaft contact 113 and the resulting increase in force can facilitate tight coupling between the driveshaft and brush head, thereby transferring vibration from the driveshaft into the brush head. By using a protrusion 112 on resilient member 110, the resilient member 110 can be pre-biased when installed in the brush head (before the driveshaft is inserted). The pre-biasing can be achieved without the need of a separate additional spring member to provide biasing and extra holding force for the driveshaft. As illustrated by FIG. 3B, this movement of protrusion 112 in the direction of arrow 420 can, depending on the specific relative dimensions of the components, cause the tip 114 of coupling member 100 to move slightly in the opposite direction of arrow 400. Thus, in area 400, tip 114 may contact cylindrical sidewall 305, while at area 410, a small gap may be formed.

Figure 6:
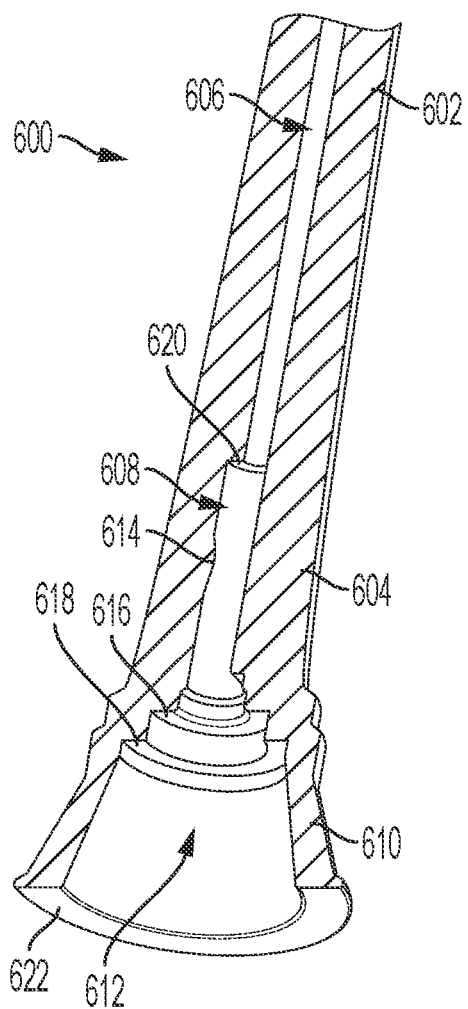
FIG. 6 is a cross-sectional view of alternate embodiment of a brush head.
Figure 7:
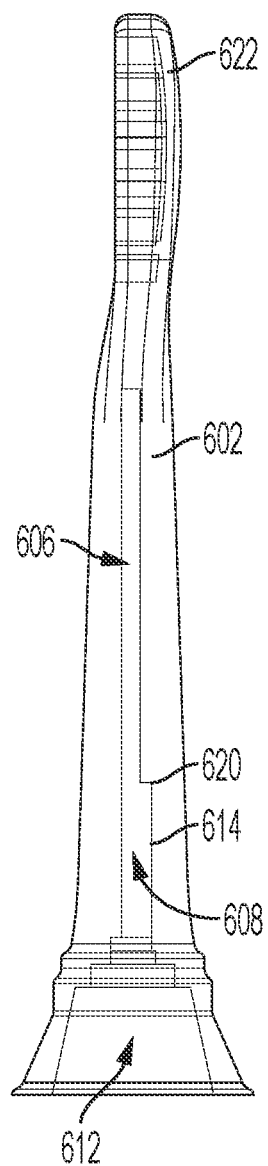
FIG. 7 is an alternate cross-sectional view of the brush head of FIG. 6.

FIGS. 6 and 7 illustrate an alternate embodiment of a brush head 600. Unlike brush head 300, which connects to a toothbrush handle using a separate coupling member, brush head 600 is formed of a single unitary piece and does not require a separate coupling member. Brush head 600 can include a stem 602 having a stem channel 606. Stem channel 606 can weaken the overall structure of the stem 602, making it more flexible. This increased flexibility can cause the brush head to have an increased amount of vibration during operation of the toothbrush. While stem channel 606 is depicted as cylindrical hole having substantially parallel sides, other shapes are possible. For example, stem channel 606 may be tapered so as to be wider at the bottom (near the base 610) and narrower at the top (near the bristle tray 622). Additionally, or alternatively, stem 602 may have a tapered outer surface being wider or narrower at one end. Thus, the thickness of the sidewall of stem 602 can be varied by varying the profiles of the stem 602 and stem channel 606. For example, a thickness of the stem sidewall can be greater at a portion closer to the base 610 than a thickness of the stem sidewall at a portion closer to the brush section (e.g., bristle tray 622). This variation in sidewall thickness can promote increased vibration of top of the brush head 600 (thereby increasing the vibration of the bristles) during operation.

Brush head 600 can further include a base 610 having an opening 612. The driveshaft of an electric toothbrush handle can be inserted into opening 612. One or more ledges 616 and 618 can be disposed within opening 612 to serve as stops for the brush head when it is placed on the toothbrush handle. The driveshaft can extend into cavity 608, which is formed by surrounding cylindrical sidewall 604. The interior of sidewall 604 of cavity 608 can include one or more ridges 614, which can contact the driveshaft. Like the driveshaft contact 113 described above, ridge 614 may be made of a flexible or resilient material and deform when the driveshaft is placed into the brush head 600. Cavity 608 can transition into stem channel 606 at ledge 620. Stem channel 606 can be a second cavity that extends from cavity 608 to at or near the brush section (e.g., bristle tray 622). In some embodiments, the second cavity (channel 606) extends along at least 50 percent of the stem section. In some embodiments, ledge 620 may also serve as stop for the toothbrush handle (i.e., by contacting the distal tip of the driveshaft). Additionally, brush head 600 can include bristle tray 622 (FIG. 7) from which multiple attached bristles can extend.

FIG. 8 is a cross sectional assembled view, and FIG. 9 is an exploded view, of an assembled electric toothbrush handle and brush head. Assembled brush 810 (including a brush head 300 and coupling member 100) can attach to toothbrush handle 820 and fit over driveshaft 822. Brush head 300 can the coupling member 100, which in turn has a cavity (within sidewall 106) for receiving the drive shaft 822 of the toothbrush handle 820. Ledges 824 and 826 of toothbrush handle 820 can contact ledge 130 of coupling member 100 and bottom surface 326 of brush head 300, respectively, limiting the amount of insertion of the driveshaft 822 into the assembled brush head 810. Although the illustration in FIGS. 8 and 9 show the coupling section 100 and brush head 300 of FIGS. 1-5, brush head 600 of FIGS. 6 and 7, could be installed in a similar manner by inserting driveshaft 822 into opening 612 until ledge 826 contacts bottom surface 622 of brush head 600 and/or ledge 824 contacts one of ledge 616 or 618 within opening 612.

The various embodiments disclosed in this patent document provide advantages over the prior art, whether stand-alone or combined. For example, the resilient wall of the handle coupling section of the coupling member that is positioned to engage with the drive shaft of the electric toothbrush handle may be made from the same wall of the handle coupling section of the coupling member, which requires no metal spring or other separate resilient member. This both achieves a tight coupling (because there is no separate part) and reduces the cost of making. Further, multiple engagements of various parts of the stem and the coupling member all facilitate a tight coupling between the coupling member and the stem, and thus improve the stability of the brush head as it is operating under the high speed vibrations of the motor inside the handle.

Further, the toothbrush head may be easy to manufacture as all the parts can be made of plastic or polyester materials. The cone shaped opening of the stem may facilitate easy receiving and coupling of the coupling member into the stem, and multiple engagement means, such as, the longitudinal ridge of the coupling member and the corresponding longitudinal channel in the stem, the resilient member and the corresponding channel in the stem, the indexing ridge and the corresponding depression in the brush head base, and the ledges of the coupling member and the corresponding portions of the brush head and toothbrush handle, each may facilitate easy sliding and positioning of the coupling member into the stem, secure mounting of the coupling member to the stem, and secure mounting of the toothbrush handle to the assembled brush head. Disclosed embodiments also provide the advantage of being able to preassemble the brush head (insert the coupling member into the brush head), which can permit distribution of the assembled brush head, limiting assembly by the end user and thereby simplifying and improving the user's experience.

Other advantages of the present invention can be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described in this document, but is intended to include all changes and modifications that are within the scope and spirit of the invention as defined in the claims.

The invention claimed is:

1. A toothbrush head for an electric toothbrush, the toothbrush head comprising:
    a brush section having a plurality of bristles attached thereon;
    a base having an opening for receiving a drive shaft of an electric toothbrush; and
    a coupling member, wherein the coupling member comprises a sidewall that surrounds a cavity for receiving the driveshaft, wherein the sidewall has at least two apertures therethrough and a resilient wall between the apertures;
    wherein the resilient wall is configured to engage with the driveshaft when the driveshaft is inserted into the coupling section, further wherein the resilient wall forms a protrusion extending away from the cavity.

2. The toothbrush head of claim 1, wherein the protrusion is configured to engage an inner wall of the base.

3. The toothbrush head of claim 2, wherein a width of the coupling member at the protrusion is greater than a width of a corresponding portion of the base where the protrusion engages the inner wall.

4. The toothbrush head of claim 1, wherein the resilient wall is configured to deform when inserted into the base.

5. The toothbrush head of claim 4, wherein the deformation causes inward movement of a portion of the resilient wall that is configured to engage the driveshaft.

6. The toothbrush head of claim 1, wherein the protrusion is formed by an outwardly curved portion of the resilient wall.

7. The toothbrush head of claim 1, wherein the resilient wall further comprises a driveshaft contact extending into the cavity.

8. The toothbrush head of claim 1, wherein the coupling member further comprises a mounting portion and the mounting portion is engaged with the base.

9. The toothbrush head of claim 8, wherein:
the mounting portion of the coupling member comprises a circumferential ridge;
the base further comprises a circumferential groove; and
the circumferential ridge is engaged with the circumferential groove.

10. The toothbrush head of claim 8, wherein:
the mounting portion of the coupling member comprises a circumferential groove;
the base further comprises a circumferential ridge; and
the circumferential ridge is engaged with the circumferential groove.

11. A toothbrush head for an electric toothbrush, the toothbrush head comprising:
a brush section having a plurality of bristles attached thereon;
a base having an opening for receiving a drive shaft of an electric toothbrush; and
a stem section connecting the base and brush section, the stem section comprising a cylindrical sidewall that surrounds a cavity for receiving the driveshaft and a stem channel, the entirety of the stem channel being disposed between the cavity and the brush section;
wherein;
the cavity is in communication with the opening,
the cylindrical sidewall comprises a ridge extending into the cavity configured to engage with the driveshaft when the driveshaft is inserted into the cavity, and
the brush section, base, and stem section are formed as a single piece.

12. The toothbrush head of claim 11, wherein the stem channel extends along at least 50 percent of the stem section.

13. The toothbrush head of claim 11, further comprising a ledge disposed between the stem section and the base.

14. The toothbrush head of claim 11, wherein a thickness of the sidewall of the stem is greater at a portion closer to the base than a thickness of the sidewall of the stem at a portion closer to the brush section.

15. The toothbrush head of claim 11, wherein the stem channel comprises a cylindrical cavity.

16. A toothbrush head for an electric toothbrush, the toothbrush head comprising:
a brush section having a plurality of bristles attached thereon;
a base having an opening for receiving a drive shaft of an electric toothbrush; and
a coupling member, wherein the coupling member comprises a sidewall that surrounds a cavity for receiving the driveshaft, wherein the sidewall has at least two apertures therethrough and a resilient wall between the apertures;
wherein:
the resilient wall forms a protrusion extending away from the cavity and is configured to deform and engage with an inner wall of the base when inserted into the base,
the resilient wall is configured to engage with the driveshaft when the driveshaft is inserted into the coupling section, and
the deformation causes inward movement of a portion of the resilient wall that is configured to engage the driveshaft.

17. The toothbrush head of claim 16, wherein a width of the coupling member at the protrusion is greater than a width of a corresponding portion of the base where the protrusion engages the inner wall.

18. The toothbrush head of claim 16, wherein the protrusion is formed by an outwardly curved portion of the resilient wall.

19. The toothbrush head of claim 16, wherein the resilient wall further comprises a driveshaft contact extending into the cavity.

20. The toothbrush head of claim 16, wherein the coupling member further comprises a mounting portion and the mounting portion is engaged with the base.

* * * * *